United States Patent
Lee et al.

(10) Patent No.: US 9,974,085 B2
(45) Date of Patent: May 15, 2018

(54) METHOD AND APPARATUS FOR INTERFERENCE ALIGNMENT IN WIRELESS COMMUNICATION SYSTEM

(71) Applicants: SAMSUNG ELECTRONICS CO. LTD., Suwon-si (KR); Korea Advanced Institute of Science and Technology, Daejeon (KR)

(72) Inventors: Jung-Hoon Lee, Daejeon (KR); Wan Choi, Daejeon (KR); Hyun-Kyu Yu, Suwon-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 349 days.

(21) Appl. No.: 13/870,514

(22) Filed: Apr. 25, 2013

(65) Prior Publication Data

US 2013/0288699 A1    Oct. 31, 2013

(30) Foreign Application Priority Data

Apr. 26, 2012 (KR) .................. 10-2012-0043818

(51) Int. Cl.
*H04W 72/08* (2009.01)
*H04W 72/04* (2009.01)
(Continued)

(52) U.S. Cl.
CPC .......... *H04W 72/082* (2013.01); *H04B 7/024* (2013.01); *H04B 7/063* (2013.01); *H04B 7/0632* (2013.01); *H04W 72/0426* (2013.01)

(58) Field of Classification Search
CPC . H04B 7/02; H04B 7/04; H04B 7/026; H04B 7/024; H04B 7/028; H04B 1/76; H04B 7/0452; H04B 7/0626; H04B 7/0417; H04B 7/0632; H04B 7/0617; H04B 17/373; H04B 7/0413; H04B 7/061; H04B 7/0619; H04B 7/0689; H04B 7/0802; H04B 17/24; H04B 17/345; H04L 5/0035; H04L 5/0051; H04L 5/005; H04L 2025/03426; H04L 1/0073; H04W 16/24;
(Continued)

(56) References Cited

U.S. PATENT DOCUMENTS 8,639,256 B2 *   1/2014   Garavaglia et al. .......... 455/447
2010/0189038 A1 *   7/2010   Chen ..................... H04L 1/0001
                                                         370/328
(Continued)

FOREIGN PATENT DOCUMENTS

KR    10-2010-0112754 A    10/2010
WO    WO 2011114079 A1 *   9/2011   ............. H04B 7/024

*Primary Examiner* — Olumide T Ajibade Akonai
(74) *Attorney, Agent, or Firm* — Jefferson IP Law, LLP

(57) ABSTRACT

A method for operating a base station in a wireless communication system is provided. In the method, feedback is received from at least one terminal. When the base station configures terminal allocation information, a terminal that the base station is to service is determined based on information included in the feedback. A combination of base stations allowing the determined terminal to obtain maximal performance is determined with consideration of the information included in the feedback and a gain of cooperation between base stations.

20 Claims, 20 Drawing Sheets

(51) Int. Cl.
*H04B 7/06* (2006.01)
*H04B 7/024* (2017.01)

(58) Field of Classification Search
CPC . H04W 36/0066; H04W 36/20; H04W 40/00; H04W 72/882; H04W 72/885; H04W 72/042; H04W 52/243; H04W 88/06; H04W 24/10; H04W 28/06; H04J 11/0026
USPC .......................................... 455/504, 513, 524
See application file for complete search history.

(56) References Cited

U.S. PATENT DOCUMENTS

| | | | |
|---|---|---|---|
| 2011/0294527 A1* | 12/2011 | Brueck | H04W 24/02 455/466 |
| 2012/0057535 A1* | 3/2012 | Zhang et al. | 370/329 |
| 2012/0188976 A1* | 7/2012 | Kim et al. | 370/329 |
| 2013/0077581 A1* | 3/2013 | Lee et al. | 370/329 |
| 2013/0196664 A1* | 8/2013 | Yiu et al. | 455/436 |
| 2013/0286991 A1* | 10/2013 | Yang | H04L 5/0073 370/329 |

* cited by examiner

| | TRANSMISSION MODE | SINR | | |
|---|---|---|---|---|
| TERMINAL 1 | A | 10dB | B | 20dB |
| TERMINAL 2 | C | 9dB | A | 14dB |
| TERMINAL 3 | A | 9dB | B | 10dB |
| TERMINAL 4 | B | 7dB | A | 8dB |
| TERMINAL 5 | C | 2dB | B | 6dB |
| ⋮ | ⋮ | | | |

FIG.7

|          | TRANSMISSION MODE | SINR |   |      |
|----------|---|------|---|------|
| TERMINAL 1 | A | 10dB | B | 20dB |
| TERMINAL 2 | C | 9dB  | A | 14dB |
| TERMINAL 3 | A | 9dB  | B | 10dB |
| TERMINAL 4 | B | 7dB  | A | 8dB  |
| TERMINAL 5 | C | 2dB  | B | 6dB  |

FIG.8A

|          | TRANSMISSION MODE | SINR |   |      |
|----------|---|------|---|------|
| TERMINAL 1 | A | 10dB | B | 20dB |
| TERMINAL 2 | C | 9dB  | A | 14dB |
| TERMINAL 3 | A | 9dB  | B | 10dB |
| TERMINAL 4 | B | 7dB  | A | 8dB  |
| TERMINAL 5 | C | 2dB  | B | 6dB  |

FIG.8B

| | TRANSMISSION MODE | SINR | | |
|---|---|---|---|---|
| TERMINAL 1 | A | 10dB | B | 20dB |
| TERMINAL 2 | C | 9dB | A | 14dB |
| TERMINAL 3 | A | 9dB | B | 10dB |
| TERMINAL 4 | B | 7dB | A | 8dB |
| TERMINAL 5 | C | 2dB | B | 6dB |

FIG.10A

| | TRANSMISSION MODE | SINR | | |
|---|---|---|---|---|
| TERMINAL 1 | A | 10dB | B | 20dB |
| TERMINAL 2 | C | 9dB | A | 14dB |
| TERMINAL 3 | A | 9dB | | |
| TERMINAL 4 | B | 7dB | | |
| TERMINAL 5 | NO FEEDBACK | | | |

FIG.10B

|  | TRANSMISSION MODE | SINR | | |
|---|---|---|---|---|
| TERMINAL 1 | A | 10dB | B | 20dB |
| TERMINAL 2 | C | 9dB | A | 14dB |
| TERMINAL 3 | A | 9dB | | |
| TERMINAL 4 | B | 7dB | | |
| TERMINAL 5 | NO FEEDBACK | | | |

FIG.11A

|  | TRANSMISSION MODE | SINR | | |
|---|---|---|---|---|
| TERMINAL 1 | A | 10dB | B | 20dB |
| TERMINAL 2 | C | 9dB | A | 14dB |
| TERMINAL 3 | A | 9dB | | |
| TERMINAL 4 | B | 7dB | | |
| TERMINAL 5 | NO FEEDBACK | | | |

FIG.11B

METHOD AND APPARATUS FOR INTERFERENCE ALIGNMENT IN WIRELESS COMMUNICATION SYSTEM

PRIORITY

This application claims the benefit under 35 U.S.C. § 119(a) of a Korean patent application filed on Apr. 26, 2012 in the Korean Intellectual Property Office and assigned Serial No. 10-2012-0043818, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) SAMSUNG ELECTRONICS CO., LTD., and the 2) KOREA ADVANCED INSTITUTE OF SCIENCE AND TECHNOLOGY

BACKGROUND OF THE INVENTION

1. Field of the Invention

The present invention relates to a wireless communication system. More particularly, the present invention relates to a method and an apparatus for interference alignment in a virtual cellular network.

2. Description of the Related Art

A representative technique for improving the performance of a cell boundary terminal in a cellular system is a Cooperative Multi-Point (COMP).

However, because the form of an interference changes depending on the result of terminal selection and the form of cooperation in the COMP technique, it is not easy to improve performance with consideration of the terminal selection and the cooperation simultaneously. In addition, because the COMP technique requires information regarding both the channel of a terminal and an interference channel, an amount of feedback increases.

Therefore, the COMP technique is not suitable for a virtual cellular network in which distribution of dispersed small base stations and terminals frequently changes and a greater number of terminal selection and cooperative techniques than that of a cellular system exist.

Therefore, a need exists for a method and an apparatus for providing interference alignment in a wireless communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for providing interference alignment in a wireless communication system.

Another aspect of the present invention is to provide a method and an apparatus for improving performance with consideration of terminal selection and the form of cooperation simultaneously in a virtual cellular network in which distribution of dispersed small base stations and terminals frequently changes and a greater number of terminal selection and cooperative techniques than that of a cellular system exist.

In accordance with an aspect of the present invention, a method for operating a base station in a wireless communication system is provided. The method includes receiving feedback from at least one terminal, when the base station configures terminal allocation information, determining a terminal that the base station is to service based on information included in the feedback, and determining a combination of base stations allowing the determined terminal to obtain maximal performance with consideration of the information included in the feedback and a gain associated with cooperation between base stations.

In accordance with another aspect of the present invention, a method for operating a terminal in a wireless communication system is provided. The method includes performing channel estimation based on a received reference signal, configuring feedback including a channel estimate result, and transmitting the configured feedback to a base station.

In accordance with still another aspect of the present invention, a method for operating a Central Management Unit (CMU) in a wireless communication system is provided. The method includes receiving feedback from at least one base station, determining a terminal that the at least one base station is to service based on information included in the feedback, and determining a combination of base stations allowing the determined terminal to obtain maximal performance with consideration of the information included in the feedback and a gain of cooperation between base stations.

In accordance with further another aspect of the present invention, an apparatus of a base station in a wireless communication system is provided. The apparatus includes a transceiver for receiving feedback from at least one terminal, and a controller for, when the base station configures terminal allocation information, for determining a terminal that the base station is to service based on information included in the feedback, and determining a combination of base stations allowing the determined terminal to obtain maximal performance with consideration of the information included in the feedback and a gain associated with cooperation between base stations.

In accordance with yet another aspect of the present invention, an apparatus of a terminal in a wireless communication system is provided. The apparatus includes a receiver for receiving a reference signal, a controller for performing channel estimation based on the reference signal and for configuring feedback including a channel estimate result, and a transmitter for transmitting the configured feedback to a base station.

In accordance with further yet another aspect of the present invention, an apparatus of a CMU in a wireless communication system is provided. The apparatus includes a transceiver for receiving feedback from at least one base station, and a controller for selecting a terminal that the at least one base station is to service based on information included in the feedback, and for determining a combination of base stations allowing the determined terminal to obtain maximal performance with consideration of the information included in the feedback and a gain of cooperation between base stations.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 7 is a view illustrating an example of collected feedback information according to an exemplary embodiment of the present invention;

FIGS. 8A and 8B are views illustrating a process for finding out a combination of base stations for terminal allocation of cooperative dispersed small base stations according to an exemplary embodiment of the present invention;

FIGS. 10A and 10B are views illustrating a case in which a threshold is considered when feedback information is configured according to an exemplary embodiment of the present invention;

FIGS. 11A and 11B are views illustrating a cooperation form of dispersed small base stations in a case in which a threshold is considered when feedback information is configured according to an exemplary embodiment of the present invention;

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for interference alignment in a virtual cellular network.

In particular, exemplary embodiments of the present invention include a method and an apparatus for controlling interference via terminal selection in a downlink of a virtual cellular system and for obtaining a high transmission speed and a high Degree of Freedom (DoF).

Figure 1:
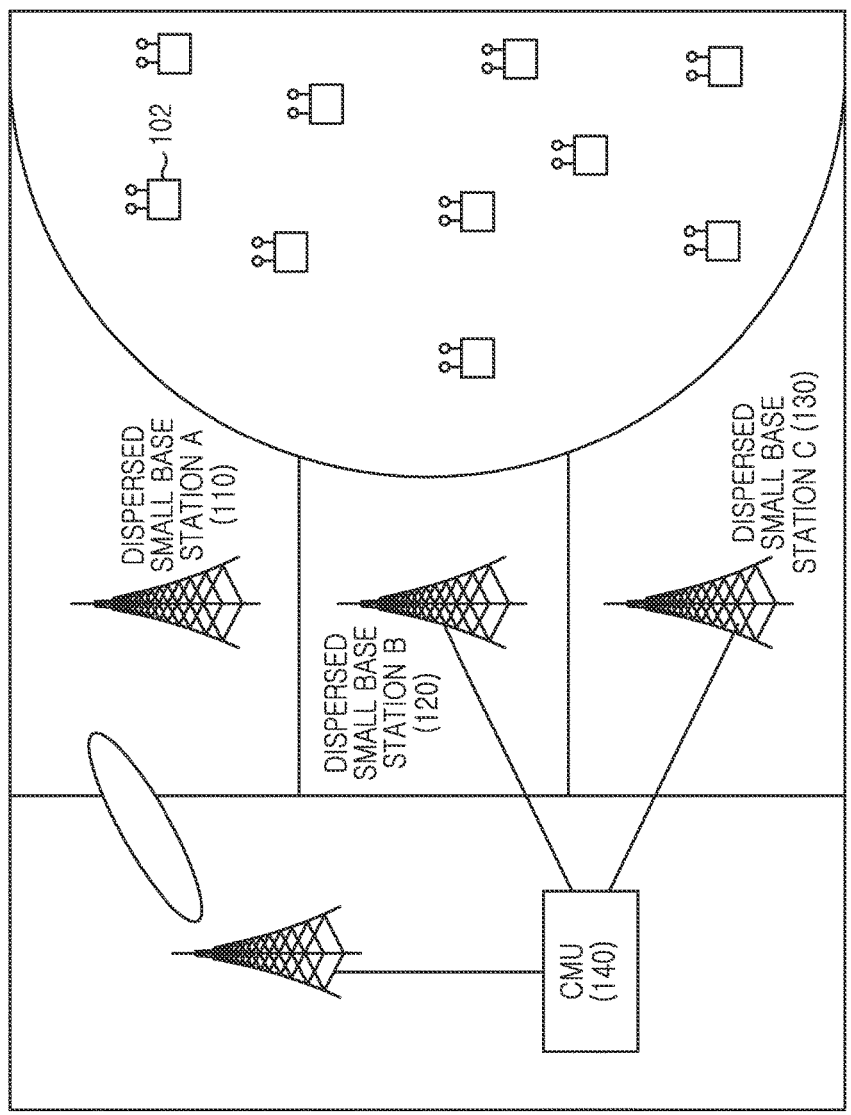
FIG. 1 is a view illustrating a virtual cellular network according to an exemplary embodiment of the present invention.

FIG. 1 is a view illustrating a virtual cellular network according to an exemplary embodiment of the present invention.

Referring to FIG. 1, a system in which a plurality of dispersed small base stations µBS 110, 120, 130 share a plurality of terminals 102 is provided. In this case, it is assumed that the dispersed small base stations 110, 120, 130 have various configurations such as cases in which the small base stations 110, 120, and 130 are fixed or may dynamically change their positions. The dispersed small base stations 110, 120, 130 are connected to a Central Management Unit (CMU) 140.

A technique according to exemplary embodiments of the present invention allows each terminal to select a dispersed small base station and to configure a Virtual Cellular Network (VCN) cluster based on the selected result. Exemplary embodiments of the present invention control interference by selecting a terminal with which interference is aligned. For this purpose, a terminal selects combinations of dispersed small base stations and feeds back values representing the performance of each combination, and the dispersed small base station selects a terminal to service based on the values representing the performance of each combination of dispersed small base station that are fed back from the terminal.

Because exemplary embodiments of the present invention allow terminals to feed back only partial channel information first, an amount of feedback of the channel information reduces and the CMU or the dispersed small base station controls interference via terminal selection, so that the complexity of terminal selection and cooperation form decision reduces. When the complexity of the terminal selection is low, it is easy to select a terminal in real-time and configure a cooperation form between dispersed small base stations.

Exemplary embodiments of the present invention propose an interference control technique for using a random beam and for selecting an interference-aligned (e.g., an interference-minimized) terminal at a transmission end. Each terminal selects a cooperation form of dispersed small base stations from which the terminal receives a service. Exemplary embodiments of the present invention configure a VCN based on the cooperation form of dispersed small base stations.

FIGS. 2A to 2D are schematic views illustrating an interference alignment technique according to an exemplary embodiment of the present invention.

Figure 2B:
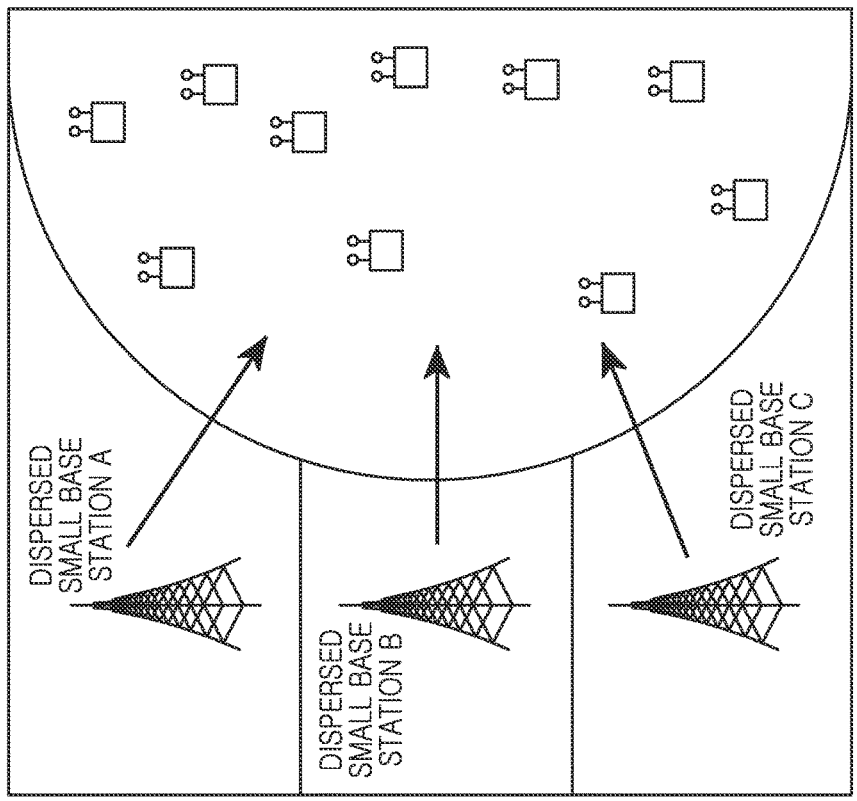
FIGS. 2A to 2D are schematic views illustrating an interference alignment technique according to an exemplary embodiment of the present invention.
Figure 2A:
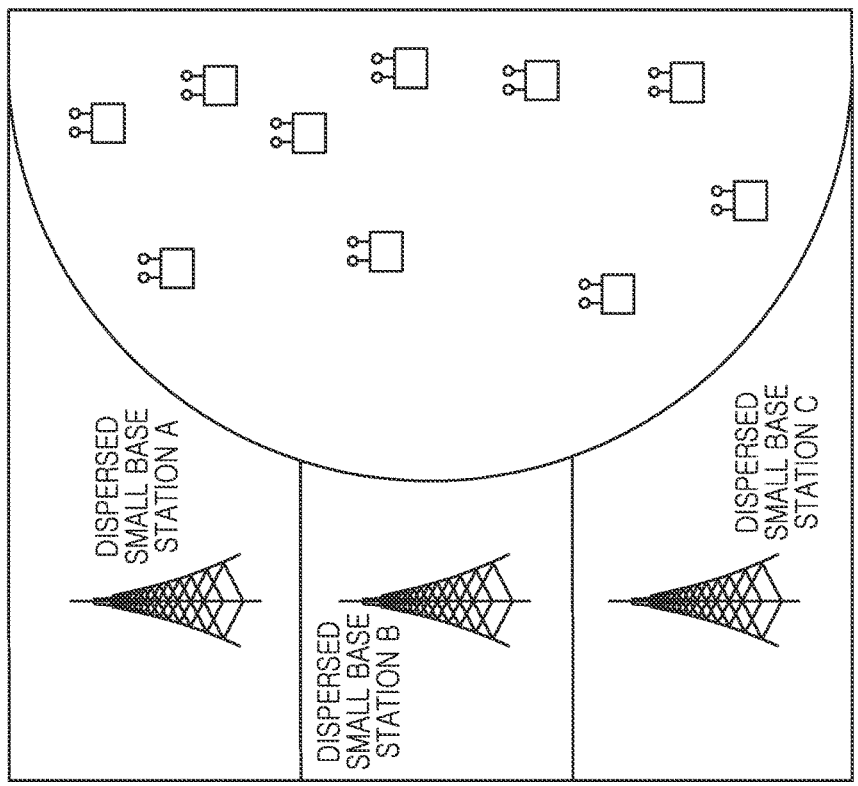
Figure 2D:
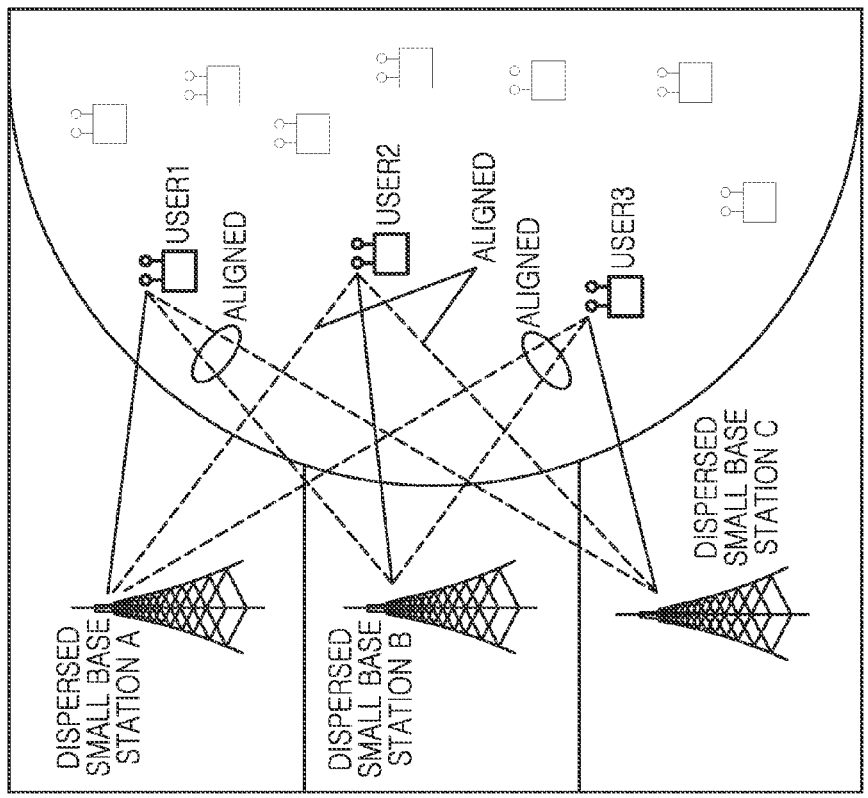
Figure 2C:
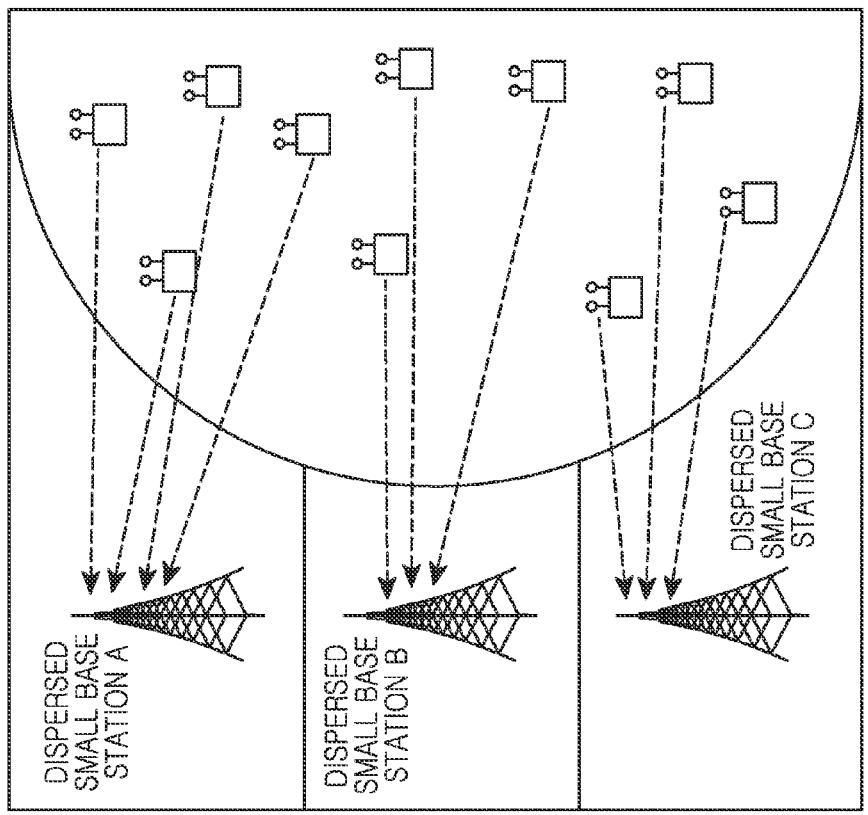

Referring to FIG. 2A, a system model similar to the VCN of FIG. 1 is illustrated. Referring to FIG. 2B, random beam transmission is illustrated. Referring to FIG. 2C, feedback of respective terminals is illustrated. Referring to FIG. 2D, terminal allocation of a CMU is illustrated.

FIG. 2B illustrates a dispersed small base station transmitting a random beam to each terminal. FIG. 2C illustrates each terminal performing channel estimation and then transmitting feedback including information representing a dispersed small base station from which the terminal desires to receive a service and cooperation forms to the dispersed small base stations. FIG. 2D illustrates that the feedback received by the dispersed small base stations are concentrated on the CMU, and the CMU determines a terminal that each dispersed small base station will service based on the feedback information and transmits the determination result to a relevant dispersed small base station. After that, the dispersed small base station provides a service to the relevant terminal.

Figure 3:
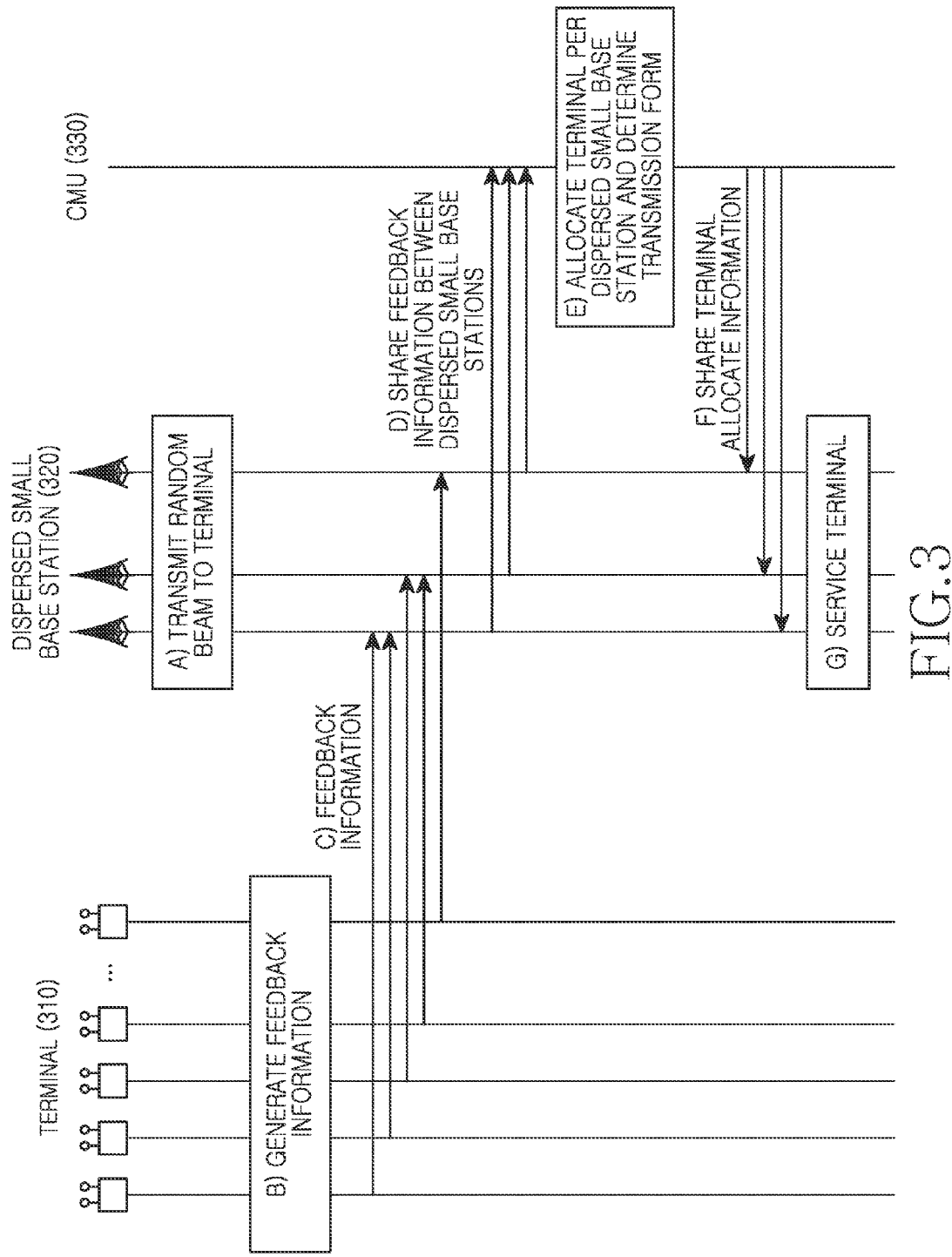
FIG. 3 is a view illustrating a process for transmitting/receiving a message in a virtual cellular network according to an exemplary embodiment of the present invention.

FIG. 3 is a view illustrating a process for transmitting/receiving a message in a virtual cellular network according to an exemplary embodiment of the present invention.

Referring to FIG. 3, a dispersed small base station 320 transmits a random beam to each terminal 310 in step A.

After that, each terminal 310 performs channel estimation and then generates feedback information including information representing a dispersed small base station from which it desires to receive a service and cooperation forms in step B. Thereafter, each terminal 310 transmits the feedback information to the dispersed small base station 320 in step C.

After that, the feedback information received by the dispersed small base station 320 is concentrated on a CMU 330 in step D. For example, the dispersed base station 320 shares the feedback information received from each terminal 310 with the CMU 330. The CMU 330 determines a terminal that each dispersed small base station 320 will service based on the feedback information in step E. Thereafter, the CMU 330 transmits the determination result to a dispersed small base station 320 in step F. Among the steps D and F, the feedback information and the terminal allocation information (e.g., information representing the terminal that the base station will service) may be shared between the dispersed small base stations 320.

Thereafter, the dispersed small base station 320 provides a service to the terminal 310 in step G.

Figure 4:
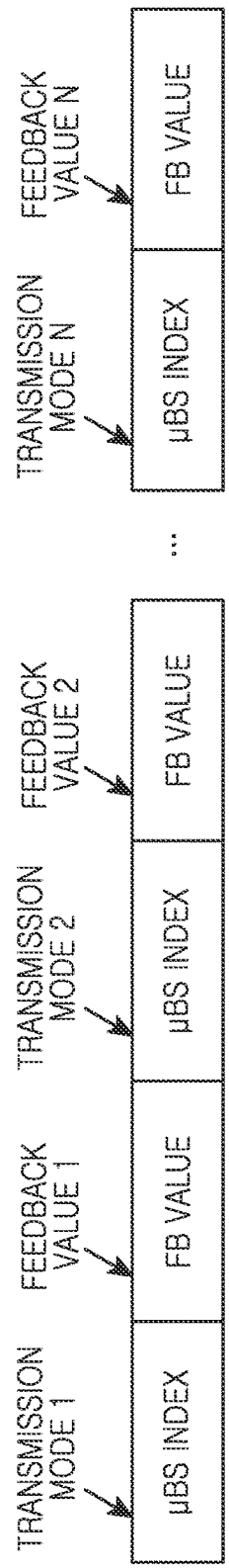
FIG. 4 is a view illustrating feedback information according to an exemplary embodiment of the present invention.
Figure 5:
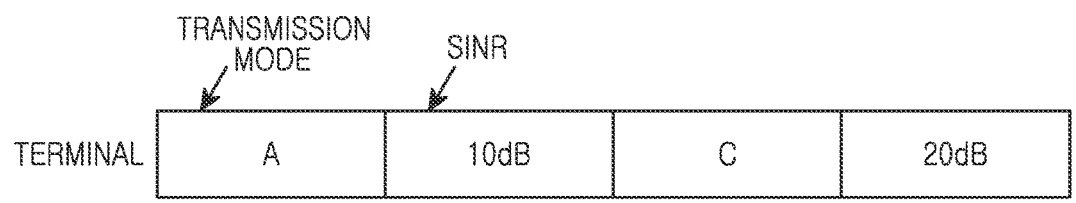
FIG. 5 is a view illustrating an example of feedback information according to an exemplary embodiment of the present invention.

FIG. 4 is a view illustrating feedback information according to an exemplary embodiment of the present invention. FIG. 5 is a view illustrating an example of feedback information according to an exemplary embodiment of the present invention.

Referring to FIGS. 4 and 5, FIG. 4 illustrates feedback information of respective terminals when maximum N dispersed small base stations are allowed to cooperate in exemplary embodiments of the present invention, and FIG. 5 illustrates a case in which a maximum of two base stations cooperate in exemplary embodiments of the present invention.

According to exemplary embodiments of the present invention, a transmission mode field corresponds to a field regarding the configuration of dispersed small base stations that will provide a service, and an FB value field is a field representing the performance of a terminal depending on a transmission mode and may include various values such as SNR, INR, SINR, and the like. As illustrated in FIG. 5, an FB value field comprises SINR.

An FB value n represents performance when dispersed small base stations from a transmission mode 1 to a transmission mode n cooperate and provide a service.

For example, in the case in which feedback information of a terminal 1 is set as illustrated in FIG. 5, the feedback information represents that SINR obtained when the terminal 1 receives a service from a dispersed small base station A is 10 dB, and SINR that can be provided when the terminal 1 additionally receives a service from a dispersed small base station C together with the dispersed small base station A is 20 dB.

The above obtained feedback information is concentrated on the CMU, and the CMU allocates terminals to each dispersed small base station based on the feedback information.

A technique for finding out a combination of base stations for terminal allocation of cooperative dispersed small base stations comprises the following two stages.

Stage 1: select one terminal at each dispersed small base station.

Stage 2: compare the gains of cooperation to merge dispersed small base stations. When no more gain associated with merging dispersed small stations exists, the procedure ends.

Figure 6:
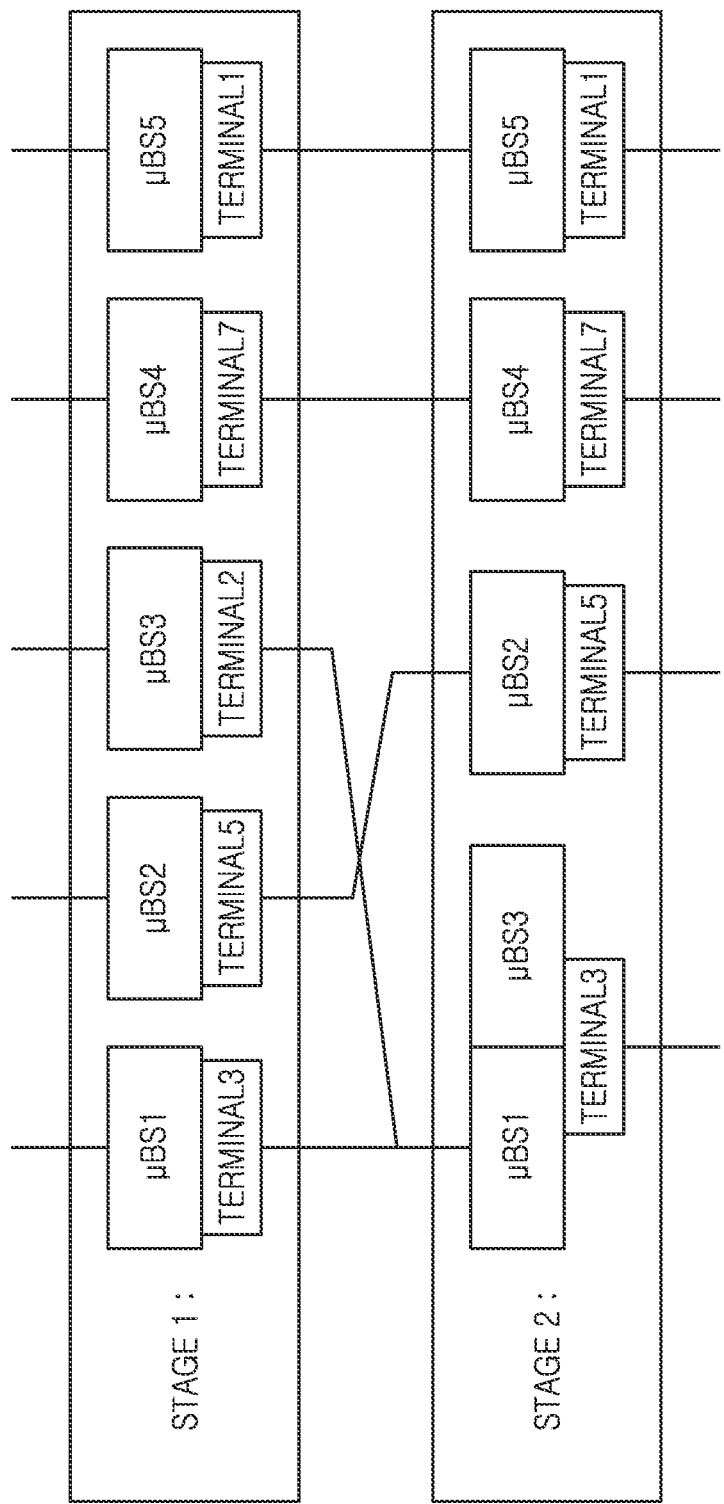
FIG. 6 is a view illustrating a process for finding out a combination of base stations for terminal allocation of cooperative dispersed small base stations according to an exemplary embodiment of the present invention.

FIG. 6 is a view illustrating a process for finding out a combination of base stations for terminal allocation of cooperative dispersed small base stations according to an exemplary embodiment of the present invention.

Referring to FIG. 6, a case in which five dispersed small base stations exist is illustrated. First, each dispersed small base station selects each terminal one by one (e.g., as described in relation to stage 1), and then merges dispersed small base stations based on this selection and determines the cooperation form of the dispersed small base stations (e.g., as described in relation to stage 2). For example, as illustrated in FIG. 6, it is determined that dispersed small base stations 1 and 3 provide a service to a terminal 3.

FIG. 7 is a view illustrating an example of collected feedback information according to an exemplary embodiment of the present invention.

Referring to FIG. 7, feedback information transmitted by a terminal is illustrated. A CMU performs the process of the above-described stages 1 and 2 based on the collected feedback information.

FIGS. 8A and 8B are views illustrating a process for finding out a combination of base stations for terminal allocation of cooperative dispersed small base stations according to an exemplary embodiment of the present invention.

Referring to FIG. 8A, a result after each dispersed small base station selects one terminal in the first stage is illustrated. For example, FIG. 8A illustrates that when a dispersed small base station A selects a terminal 1 to provide a service, the base station A can obtain performance of 10 dB, and when a dispersed small base station B selects a terminal 4 to provide a service and a dispersed small base station C selects a terminal 2 to provide a service, the dispersed small base stations B and C can obtain performances of 7 dB and 9 dB, respectively. A process for selecting one terminal may include selecting a terminal or a base station having a highest performance value (FB value).

Referring to FIG. 8B, dispersed small base stations are merged in a second stage, and when a gain exists in performance after the merge, cooperation between dispersed small base stations are determined. Because performance (20 dB) that can be obtained when a dispersed small base station A and a dispersed small base station B select a terminal 1 and provide a service simultaneously is better than a case in which the dispersed small base station A provides a service to the terminal 1 and the dispersed small base station B provides a service to a terminal 4, the dispersed small base station A and the dispersed small base station B provide the service to the terminal 1 simultaneously. For example, FIG. 8B illustrates selecting a combination of base stations allowing a specific terminal to obtain maximal performance (e.g., optimal performance). This process may also be expressed as illustrated in FIG. 9.

Figure 9:
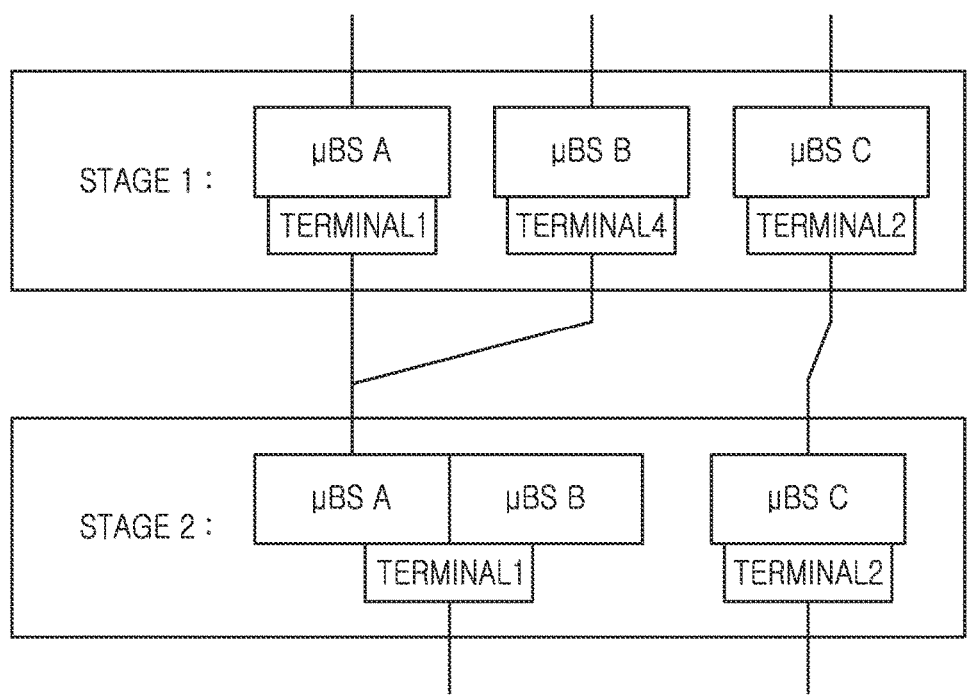
FIG. 9 is a view illustrating a process for finding out a combination of base stations for terminal allocation of cooperative dispersed small base stations according to an exemplary embodiment of the present invention.

FIG. 9 is a view illustrating a process for finding out a combination of base stations for terminal allocation of cooperative dispersed small base stations according to an exemplary embodiment of the present invention.

Referring to FIG. 9, the process of FIG. 8 is illustrated differently. A first stage illustrates a result after each dispersed small base station selects one terminal is illustrated. A second stage illustrates that dispersed small base stations are merged and when a gain exists in performance after the merge, cooperation between dispersed small base stations is determined, so that dispersed small base stations A and B simultaneously provide a service to a terminal 1.

In addition, feedback of a variable length may be considered as a technique for reducing an amount of feedback information. This may be implemented in a method of setting a predetermined threshold for each step and when an effect of performance improvement is trivial, omitting relevant feedback. A case in which reduction in the amount of feedback information is required is various such as a decision of a manufacturer, a channel state, a definition of a standard, and it is obvious that a relevant condition is not limited.

FIGS. 10A and 10B are views illustrating a case in which a threshold is considered when feedback information is configured according to an exemplary embodiment of the present invention.

Referring to FIGS. 10A and 10B, a case in which performance that can be obtained from one dispersed small base station is 5 dB and performance improved when a terminal receives an additional service from a different dispersed small base station is limited to 5 dB, is illustrated.

In FIG. 10A, because a terminal 5 cannot obtain performance of 5 dB from one dispersed small base station, the terminal 5 does not transmit feedback data, and a terminal 3 and a terminal 4 feed back only performance that can be obtained from one dispersed small base station because a gain that can be obtained from use of an additional dispersed small base station is less than a threshold.

In FIG. 10B, feedback information actually transmitted after the above-described threshold is applied is illustrated.

FIGS. 11A and 11B are views illustrating a cooperation form of dispersed small base stations in a case in which a threshold is considered when feedback information is configured according to an exemplary embodiment of the present invention.

Referring to FIGS. 11A and 11B, a cooperation form of dispersed small base stations that can be obtained using variable feedback configuration is illustrated. It is revealed that the same result as a case in which the threshold is not considered is obtained even when the threshold is considered.

Even when the threshold is considered and feedback information with a reduced amount of information is transmitted as illustrated in FIG. 11A, the same result as a case in which the threshold is not considered is obtained as illustrated in FIG. 11B.

According to exemplary embodiments of the present invention, the same cooperation form of dispersed small base stations can be obtained even with a reduced amount of feedback information.

Figure 12:
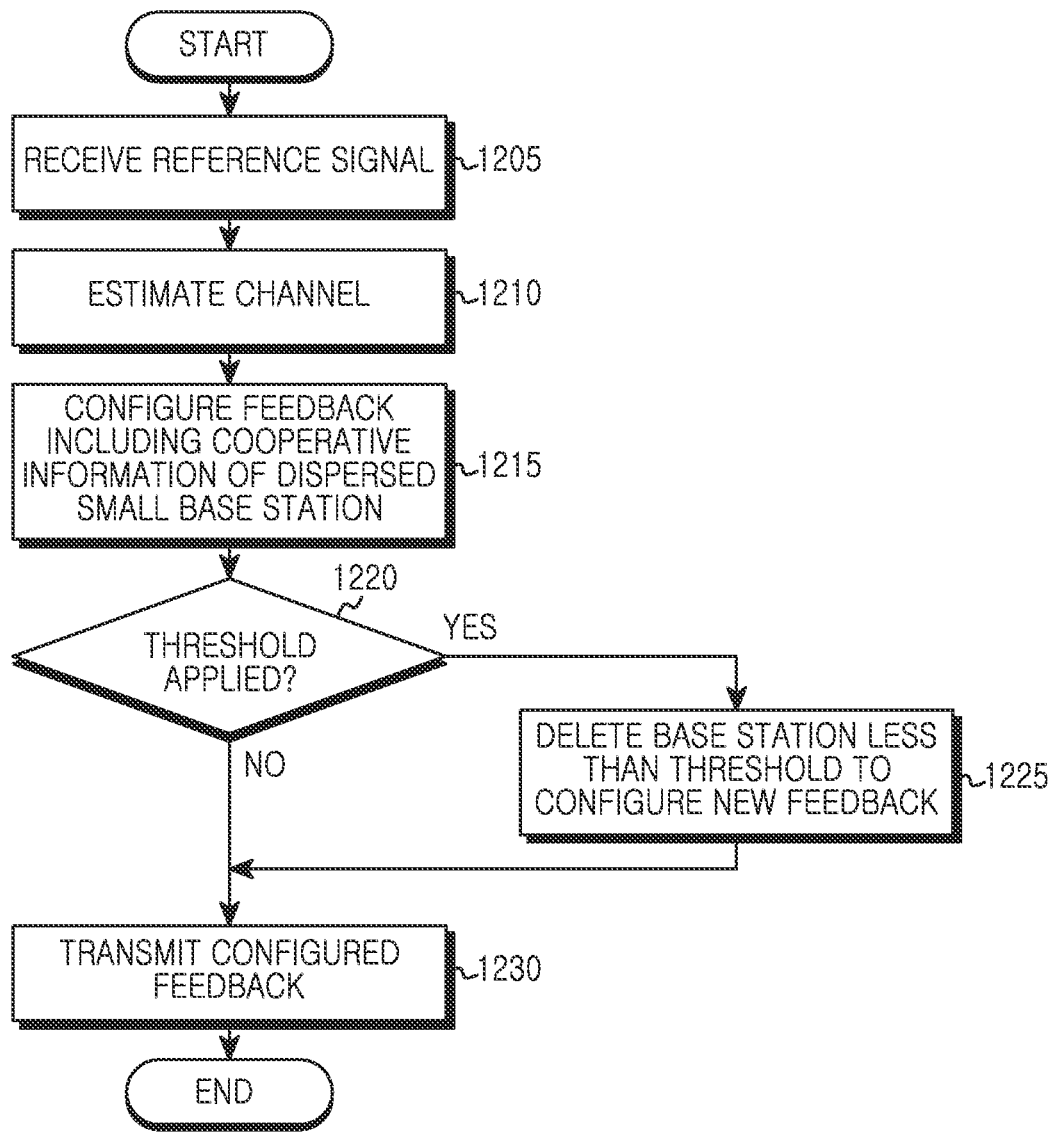
FIG. 12 is a flowchart illustrating a process for operating a terminal according to an exemplary embodiment of the present invention.

FIG. 12 is a flowchart illustrating a process for operating a terminal according to an exemplary embodiment of the present invention.

Referring to FIG. 12, a terminal receives a reference signal from a dispersed small base station in step 1205. The reference signal is included in a random beam transmitted by the dispersed small base station.

After that, the terminal performs channel estimation on the reference signal in step 1210. Thereafter, the terminal configures feedback including cooperation information of dispersed small base stations in step 1215. As an example, the cooperation information is illustrated in FIG. 4.

When feedback information reduction via the threshold setting is not required in step 1220, the process proceeds to step 1230 in which the configured feedback is transmitted to the dispersed small base station.

When the feedback information reduction via the threshold setting is required in step 1220, the process proceeds to step 1225 in which a base station smaller than the threshold is deleted from the configured feedback, so that new feedback is configured. An example of the newly configured feedback is illustrated in FIG. 10.

Thereafter, the process proceeds to step 1230 in which the terminal transmits the newly configured feedback to the dispersed small base station.

The method described above in relation with FIG. 12 according to exemplary embodiment of the present invention may be provided as one or more instructions in one or more software modules, or computer programs stored in an electronic device including a portable terminal.

Figure 13:
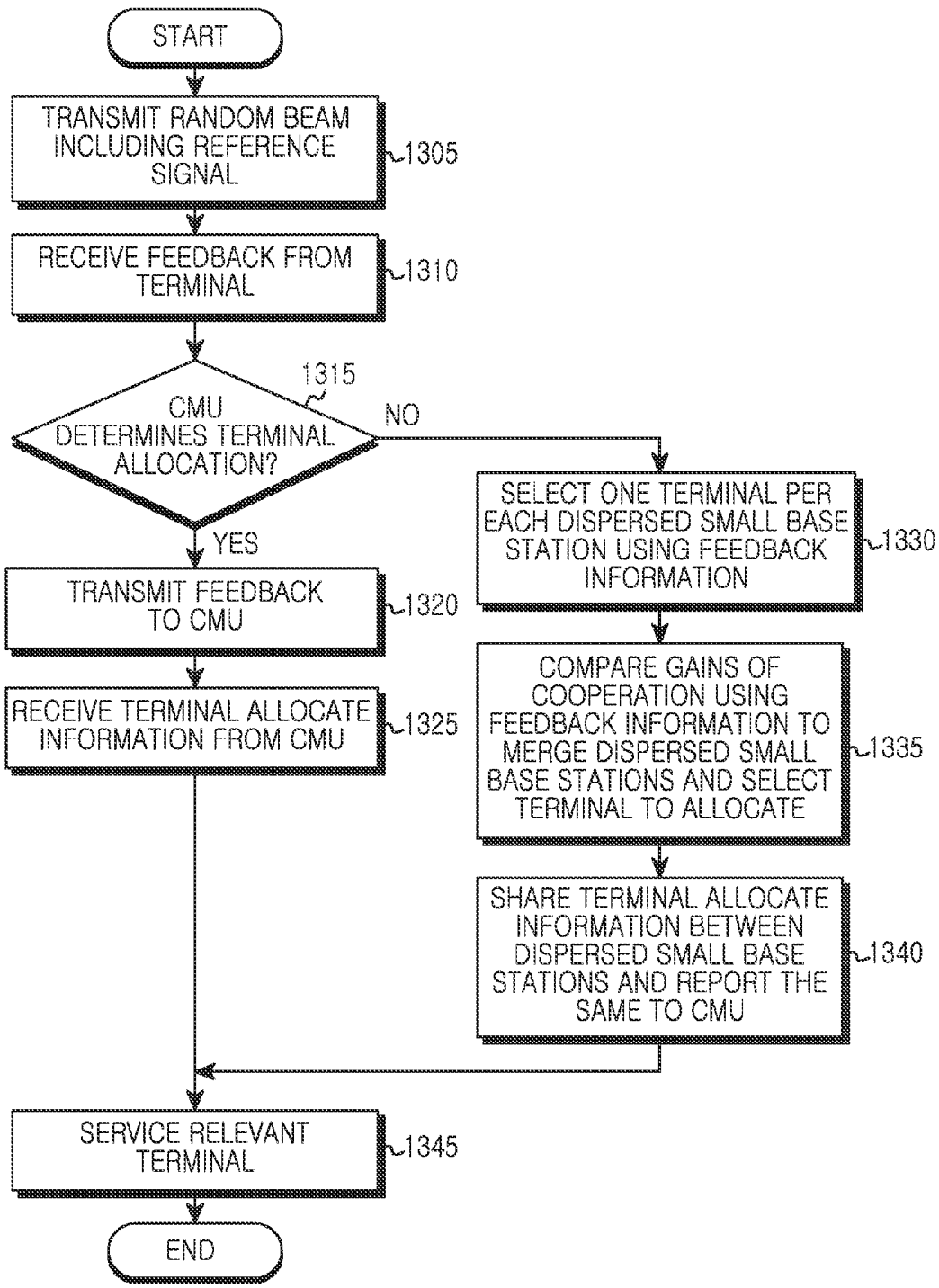
FIG. 13 is a flowchart illustrating a process for operating a dispersed small base station according to an exemplary embodiment of the present invention.

FIG. 13 illustrates a process for operating a dispersed small base station according to an exemplary embodiment of the present invention.

Referring to FIG. 13, the dispersed small base station transmits a random beam including a reference signal to a terminal in step 1305. Thereafter, the dispersed small base station receives feedback from the terminal in step 1310.

When a CMU determines terminal allocation in step 1315, the process proceeds to step 1320 in which the dispersed small base station transmits the received feedback to the CMU. Thereafter, the dispersed small base station receives terminal allocation information from the CMU in step 1325.

Thereafter, the dispersed base station provides a service to terminals allocated to the dispersed small base station in step 1345.

When the CMU does not determine terminal allocation in step 1315, the process proceeds to step 1330 in which the dispersed small base station performs a process for selecting one terminal per each dispersed small base station using the feedback. For example, the dispersed small base station selects one terminal to service.

Thereafter, the dispersed small base station selects a terminal to allocate by comparing the gains of cooperation using the feedback and merging dispersed small base stations in step 1335. An example of the merging process according to exemplary embodiments of the present invention is illustrated in FIG. 8.

Thereafter, the dispersed small base station shares the terminal allocation information between dispersed small base stations or reports the terminal allocation information to the CMU when needed in step 1340.

Thereafter, the dispersed small base station provides a service to a relevant terminal in step 1345.

The method described above in relation with FIG. 13 according to exemplary embodiment of the present invention may be provided as one or more instructions in one or more software modules, or computer programs stored in an electronic device.

Figure 14:
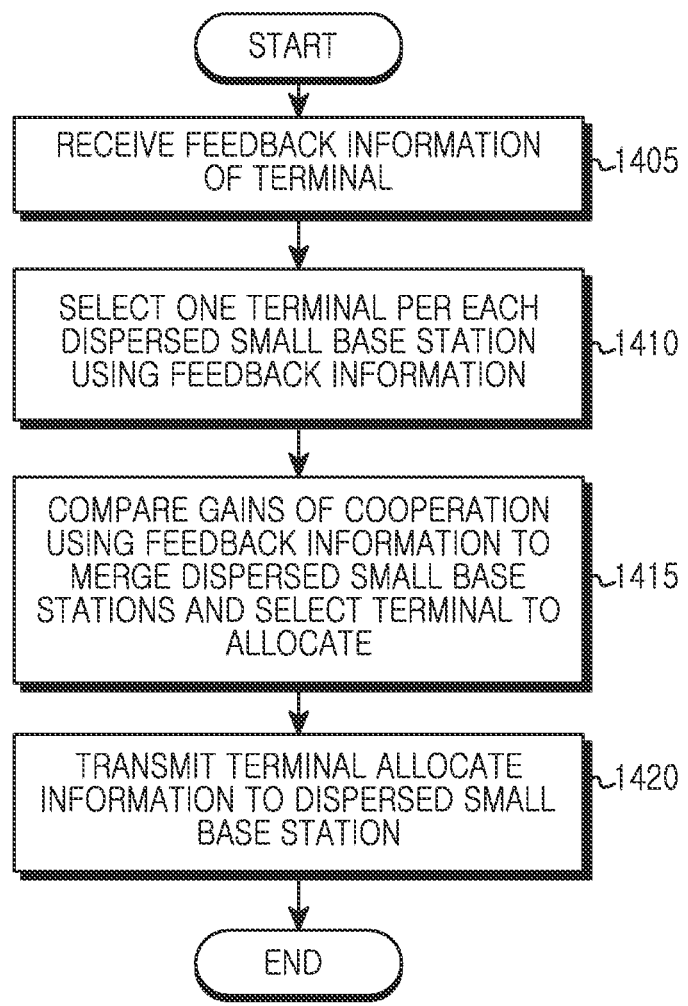
FIG. 14 is a flowchart illustrating a process for operating a Central Management Unit (CMU) according to an exemplary embodiment of the present invention.

FIG. 14 is a flowchart illustrating a process for operating a CMU according to an exemplary embodiment of the present invention.

Referring to FIG. 14, the CMU receives feedback from a dispersed small base station in step 1405.

Thereafter, the CMU performs a process for selecting one terminal per each dispersed small base station using the feedback information in step 1410.

Thereafter, the CMU selects a terminal to allocate by comparing the gains of cooperation using the feedback and merging dispersed small base stations in step 1415. An example of the merging process according to exemplary embodiments of the present invention is illustrated in FIG. 8.

Thereafter, the CMU transmits terminal allocation information to the dispersed small base station in step 1420.

The method described above in relation with FIG. 14 according to exemplary embodiment of the present invention may be provided as one or more instructions in one or more software modules, or computer programs stored in an electronic device.

Figure 15:
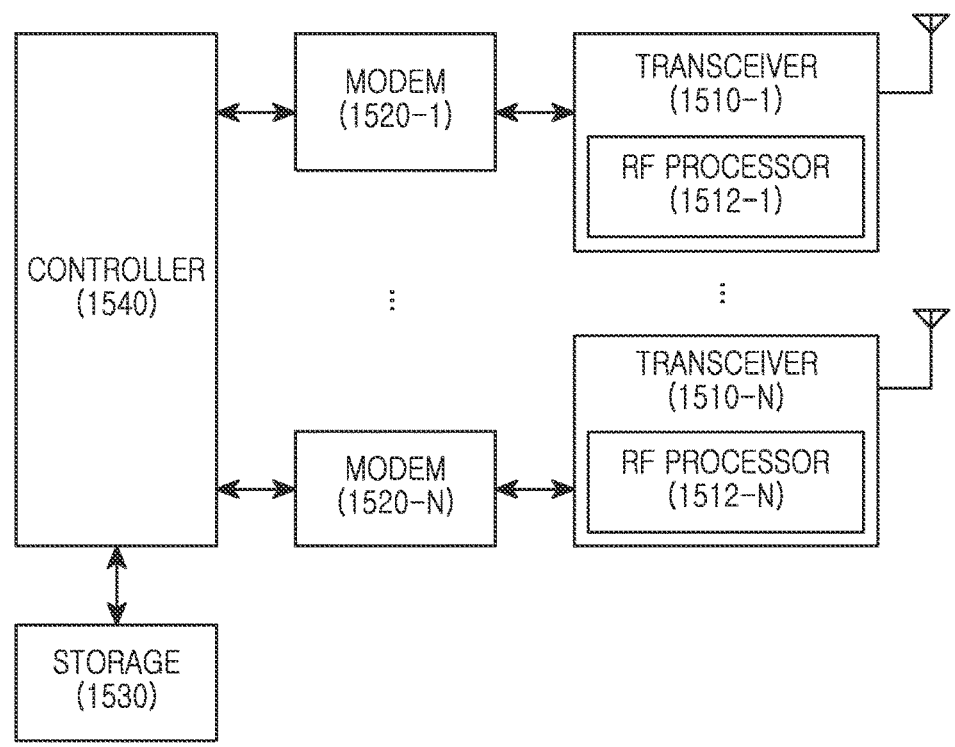
FIG. 15 is a block diagram illustrating a dispersed small base station according to an exemplary embodiment of the present invention.

FIG. 15 is a block diagram illustrating a dispersed small base station according to an exemplary embodiment of the present invention.

Referring to FIG. 15, the dispersed small base station includes a plurality of transceivers 1510-1 to 1510-N, a plurality of modems 1520-1 to 1520-N, a storage 1530, and a controller 1540.

The plurality of transceivers 1510-1 to 1501-N are installed dispersedly and perform a function for transmitting/receiving a signal via a radio channel.

For example, each of the plurality of transceivers 1510-1 to 1510-N respectively includes Radio Frequency (RF) processors 1512-1 to 1512-N. The RF processors 1512-1 to 1512-N perform conversion between a baseband signal and an RF signal.

For example, the RF processor 1512-1 to 1512-N may include an amplifier, a mixer, an oscillator, a Digital-to-Analog Converter (DAC), an Analog-to-Digital Converter (ADC), and the like.

The plurality of modems 1520-1 to 1520-N perform a conversion function between a baseband signal and a bit line depending on a physical layer standard of a system.

For example, when transmitting data, the plurality of modems 1520-1 to 1520-N generate complex symbols by encoding and modulating a transmission bit line. Also, when receiving data, the plurality of modems 1520-1 to 1520-N recover a reception bit line by demodulating and decoding a baseband signal provided from the plurality of transceivers 1510-1 to 1510-N. According to an Orthogonal Frequency Division Multiplexing (OFDM) scheme, the plurality of modems 1520-1 to 1520-N may further perform a Fast Fourier Transform (FFT) operation and an Inverse Fast Fourier Transform (IFFT) operation.

Though the plurality of modems 1520-1 to 1520-N have been illustrated in case of FIG. 15, the plurality of modems 1520-1 to 1520-N may be configured as one block according to exemplary embodiments of the present invention. In this case, one modem processes signals corresponding to the plurality of transceivers 1510-1 to 1510-N sequentially or in parallel. According to still other exemplary embodiments of the present invention, each of the plurality of modems 1520-1 to 1520-N may be respectively included in the plurality of corresponding transceivers 1510-1 to 1510-N. For example, each of the plurality of transceivers 1510-1 to 1510-N may respectively include the RF processors 1512-1 to 1512-N and the modems 1520-1 to 1520-N.

The storage 1530 stores a program, and data such as system information, setting information, and the like. In addition, the storage 1530 provides stored data according to a request of the controller 1540.

The controller 1540 controls overall functions of the base station. For example, the controller 1540 controls the plurality of transceivers 1510-1 to 1510-N and the plurality of modems 1520-1 to 1520-N.

The controller 1540 transmits a random beam including a reference signal to a terminal and receives feedback from the terminal.

When a CMU determines terminal allocation, the controller 1540 transmits the received feedback to the CMU and receives terminal allocation information from the CMU to provide a service to terminals allocated to the dispersed small base station using the terminal allocation information.

In contrast, when the CMU does not determine the terminal allocation, the controller 1540 performs a process for selecting one terminal per each dispersed small base station using the feedback, compares the gain of cooperation using the feedback, and merges dispersed small base stations to select a terminal to allocate and provide a service to the relevant terminal. An example of the merging process according to exemplary embodiments of the present invention is illustrated in FIG. 8.

The controller 1540 may share the terminal allocation information between dispersed small base stations or report the terminal allocation information to the CMU when needed.

Figure 16:
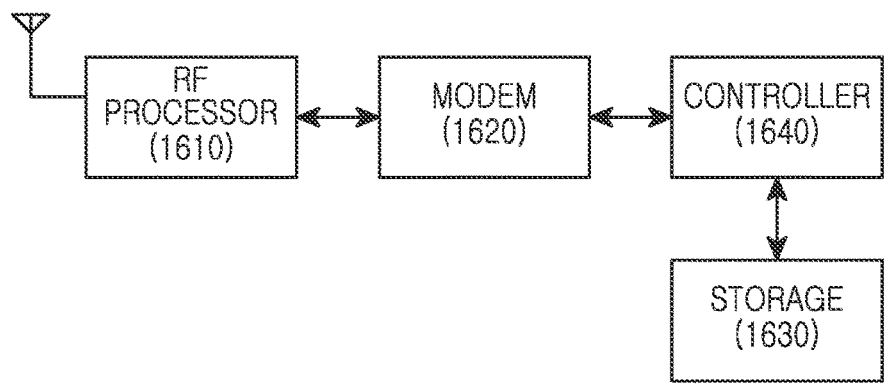
FIG. 16 is a block diagram illustrating a terminal in a wireless communication system according to an exemplary embodiment of the present invention.

FIG. 16 is a block diagram illustrating a terminal in a wireless communication system according to an exemplary embodiment of the present invention.

Referring to FIG. 16, the terminal includes an RF processor 1610, a modem 1620, a storage 1630, and a controller 1640.

The RF processor 1610 performs a function for transmitting/receiving a signal via a radio channel such as band conversion of a signal, amplification, and the like. For example, the RF processor 1610 up-converts a baseband signal provided from the modem 1620 to an RF signal, and then transmits the RF signal via an antenna, and down-converts an RF signal received via the antenna to a baseband signal. For example, the RF processor 1610 may include an amplifier, a mixer, an oscillator, a DAC, an ADC, and the like.

The modem 1620 performs a conversion function between a baseband signal and a bit line according to a physical layer standard of a system. For example, when transmitting data, the modem 1620 generates complex symbols by encoding and modulating a transmission bit line. Also, when receiving data, the modem 1620 recovers a reception bit line via demodulation and decoding of a baseband signal provided from the RF processor 1610. According to the OFDM scheme, the modem 1620 may further perform an IFFT operation and an FFT operation.

The storage 1630 stores a basic program for operating the terminal, an application, and data such as system information, setting information, and the like. In addition, the storage provides stored data according to a request of the controller 1640.

The controller 1640 controls overall operations of the terminal According to exemplary embodiments of the present invention, the controller 1640 receives a reference signal from a dispersed small base station. The reference signal is included in a random beam transmitted by the dispersed small base station.

The controller 1640 performs channel estimation on the reference signal, configures feedback including cooperation information of a dispersed small base station, and transmits the configured feedback to the dispersed small base station. An example of cooperation information according to exemplary embodiments of the present invention is illustrated in FIG. 4.

When reduction of an amount of feedback information is required via threshold setting, the controller 1640 deletes a base station less than the threshold from the configured feedback to configure new feedback, and transmits the newly configured feedback to the dispersed small base station. An example of the new feedback configuration according to exemplary embodiments of the present invention is illustrated in FIG. 10.

The present invention may be implemented in an electronic device including the terminal such as, for example, a smart phone and a mobile telecommunication terminal. Hereunder, a portable terminal is used as an example for the electronic device.

Figure 17:
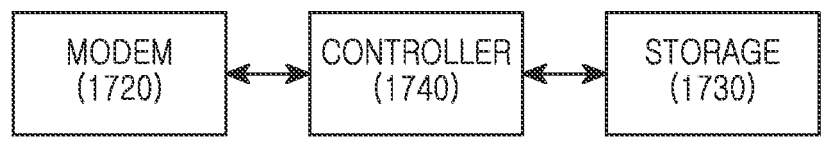
FIG. 17 is a block diagram illustrating a CMU according to an exemplary embodiment of the present invention.

FIG. 17 is a block diagram illustrating a CMU according to an exemplary embodiment of the present invention.

Referring to FIG. 17, the CMU includes a modem 1720, a storage 1730, and a controller 1740.

The modem 1720 is a module for communicating with other devices and includes a wired processor and a baseband processor. The wired processor converts a signal received via a wired path to a baseband signal to provide the baseband signal to the baseband processor, converts the baseband signal from the baseband processor to a wired signal so that the signal may be transmitted on the wired path, and transmits the wired signal via the wired path.

The controller 1740 controls an overall operation of the CMU. The controller 1740 controls the modem 1720 and the storage 1730.

The storage 1730 performs a function for storing a program for controlling an overall operation of the terminal and temporary data occurring during execution of a program.

The controller 1740 performs a function for receiving feedback from a dispersed small base station and selecting one terminal per each dispersed small base station using the feedback.

The controller 1740 selects a terminal to allocate by comparing the gains of cooperation using the feedback and merging dispersed small base stations. An example of the merging process according to exemplary embodiments of the present invention is illustrated in FIG. 8.

The controller 1740 transmits terminal allocation information to the dispersed small base station.

Assuming that a channel from a k-th dispersed small base station at an n-th terminal is $h_n^{(k)}$, when each terminal receives a service from one dispersed small base station, a OS index of a selected dispersed small base station and a field value representing the performance at this point contained in feedback information may be configured as described below depending on the kind of the feedback such as MAX SNR, MIN INR, and MAX SINR.

First, the MAX SNR feedback is given by Equation (1):

$$\text{Transmission mode} = \operatorname*{argmax}_{k} \|h_n^{(k)}\|^2 \qquad \text{Equitation (1)}$$

$$\text{Feedback value} = \max_{k} \|h_n^{(k)}\|^2$$

Also, the MIN INR feedback is given by Equation (2):

$$\text{Transmission mode} = \operatorname*{argmin}_{k} \lambda_{min}\left(\sum_{i \neq k} h_n^{(i)} h_n^{(i)+}\right) \qquad \text{Equitation (2)}$$

$$\text{Feedback value} = \min_{k} \lambda_{min}\left(\sum_{i \neq k} h_n^{(i)} h_n^{(i)+}\right)$$

Also, the MAX SINR feedback is given by Equation (3):

$$\text{Transmission mode} = \operatorname*{argmax}_{k}\left((L_n^{(k)})^{-1} h_n^{(i)} h_n^{(i)+} (L_n^{(k)+})^{-1}\right) \qquad \text{Equitation (3)}$$

$$\text{Feedback value} = \max_{k} \lambda_{max}\left((L_n^{(k)})^{-1} h_n^{(i)} h_n^{(i)+} (L_n^{(k)+})^{-1}\right)$$

where $$L_n^{(k)} L_n^{(k)+} = I + \sum_{i \neq k} h_n^{(i)} h_n^{(i)+}$$

Figure 18:
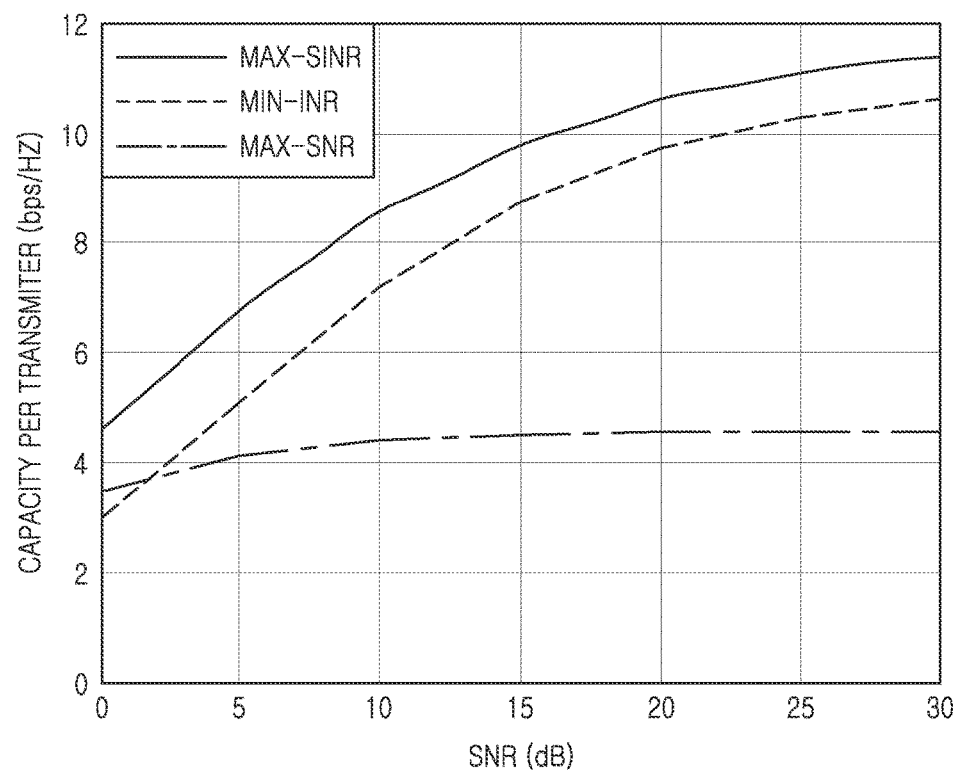
FIG. 18 is a graph illustrating the performance of providing interference alignment in a case in which a number of dispersed small base stations is 4, a number of reception antennas per terminal is 3, and a number of terminals is 30 according to an exemplary embodiment of the present invention.

FIG. 18 is a graph illustrating the performance of providing interference alignment in a case in which a number of dispersed small base stations is 4, a number of reception antennas per terminal is 3, and a number of terminals is 30 according to an exemplary embodiment of the present invention.

Referring to FIG. 18, it is revealed that the performance changes depending on the kind of feedback in each case and the performance is best in case of MAX SINR.

Figure 19:
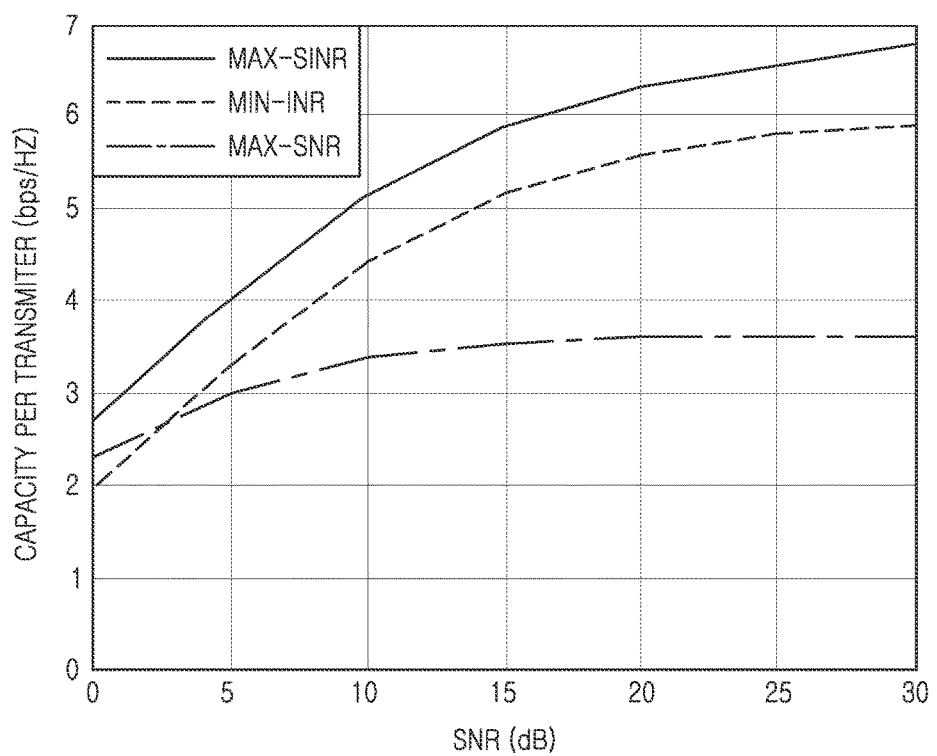
FIG. 19 is a graph illustrating a performance of providing interference alignment in a case in which a number of dispersed small base stations is 3, a number of reception antennas per terminal is 2, and a number of terminals is 30 according to an exemplary embodiment of the present invention.

FIG. 19 is a graph illustrating the performance of providing interference alignment in a case in which a number of dispersed small base stations is 3, a number of reception antennas per terminal is 2, and a number of terminals is 30 according to an exemplary embodiment of the present invention.

Referring to FIG. 19, it is revealed that the performance changes depending on the kind of feedback in each case and the performance is best in case of MAX SINR.

Embodiments of the present invention according to the claims and description in the specification can be realized in the form of hardware, software or a combination of hardware and software.

Such software may be stored in a non-transitory computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of non-transitory machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

According to exemplary embodiments of the present invention, because terminals feedback only partial channel information, an amount of feedback of the channel information reduces. Also, because a CMU or a dispersed small base station controls interference via terminal selection, complexity of terminal selection and cooperation form determination reduces. When the complexity of the terminal selection is low, it is easy to select a terminal in real-time and configure a cooperation form between dispersed small base stations.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a base station in a wireless communication system, the method comprising:
receiving, from a terminal, feedback information comprising information regarding a first gain for a first channel between the base station and the terminal, and a second gain for a combined channel of the first channel and a second channel;
determining to cooperatively serve the terminal with another base station based on a difference between the second gain and the first gain with respect to a quality of a third channel; and
in response to the determination, transmitting data to the terminal by cooperating with the another base station,
wherein the second channel is a channel between the another base station and the terminal, and
wherein the third channel is a channel between the another base station and another terminal.

2. The method of claim 1, further comprising:
transmitting allocation information to other base stations,
wherein the allocation information comprises information for the another base station to cooperatively serve the terminal.

3. The method of claim 1, further comprising:
transmitting the feedback information to an upper node; and
receiving allocation information from the upper node,
wherein the allocation information comprises information for the another base station to cooperatively serve the terminal.

4. The method of claim 1, further comprising determining the terminal that is served by the base station with a highest gain among a plurality of terminals including the terminal based on the feedback information.

5. The method of claim 1, wherein the quality of the third channel comprises a third gain, and
wherein the transmitting of the data to the terminal by cooperating with the another base station comprises, if the second gain exceeds a sum of the first gain and a third gain, transmitting, to the terminal data by cooperating with the another base station.

6. A method for operating a terminal in a wireless communication system, the method comprising:
transmitting, to a base station, feedback information comprising information regarding a first gain for a first channel between the base station and the terminal, and a second gain for a combined channel of the first channel and a second channel,
receiving data which are transmitted by the base station cooperating with another base station,
wherein the cooperating of the base station with the another base station is determined based on a difference between the second gain and the first gain with respect to a quality of a third channel,
wherein the second channel is a channel between the another base station and the terminal;
wherein the third gain is gain for a third channel between the another base station and another terminal.

7. The method of claim 6, wherein the second gain is higher than the first gain by at least information than a threshold gain.

8. The method of claim 6, wherein the quality of the third channel comprises a third gain, and
wherein the receiving of the data which are transmitted by the base station cooperating with the another base station comprises, if the second gain exceeds a sum of the first gain and a third gain, receiving data which are transmitted by the base station cooperating with the another base station.

9. A method for operating an upper node in a wireless communication system, the method comprising:

receiving first feedback information comprising information regarding a first gain for a first channel between a base station and a terminal, and a second gain for a combined channel of the first channel and a second channel, wherein the second channel is a channel between another base station and the terminal, and second feedback information comprising information regarding a third gain for a third channel between the another base station and another terminal; and transmitting, to the base station, allocation information so that the base station transmits data to the terminal by cooperating with the another base station, wherein the cooperating of the base station with the another base station is determined based on a difference between the second gain and the first gain with respect to a quality of a third channel.

10. The method of claim 9, further comprising:

determining the allocation information based on the first feedback information and the second feedback information.

11. An apparatus of a base station in a wireless communication system, the apparatus comprising:

at least one transceiver configured to receive, from a terminal, feedback information comprising information regarding a first gain for a first channel between the base station and the terminal, and a second gain for a combined channel of the first channel and a second channel; and at least one processor, operatively coupled to the at least one transceiver, the at least one transceiver configured to:

determine to cooperatively serve the terminal with another base station based on a difference between the second gain and the first gain with respect to a quality of a third channel, and wherein the at least one transceiver is further configured to transmit data to the terminal by cooperating with the another base station in response to the determination, wherein the second channel is a channel between the another base station and the terminal, and wherein the third channel is a channel between the another base station and another terminal.

12. The apparatus of claim 11, wherein the processor transmits allocation information to other base stations via the transceiver, and wherein the allocation information comprises information for the another base station to cooperatively serve the terminal.

13. The apparatus of claim 11, wherein the processor is configured to:

transmit the feedback information to a upper node via the transceiver, and receive the allocation information from the upper node, and wherein the allocation information comprises information for the another base station to cooperatively serve the terminal.

14. The apparatus of claim 11, wherein the processor is further configured to determine the terminal is served by the base station with a highest gain among a plurality of terminals including the terminal based on the feedback information.

15. The apparatus of claim 11, wherein the quality of the third channel comprises a third gain, and wherein the at least one transceiver is further configured to if, the second gain exceeds a sum of the first gain and a third gain, transmitting, to the terminal, data by cooperating with the another base station.

16. An apparatus of a terminal in a wireless communication system, the apparatus comprising:

at least one processor;

at least one transceiver, operatively coupled to the at least one processor, the at least one transceiver configured to:

transmit, to a base station, feedback information comprising information regarding a first gain for a first channel between the base station and the terminal, and a second gain of for combined channel of the first channel and a second channel, receive data which are transmitted by the base station cooperating with another base station, wherein the cooperating of the base station with the another base station is determined based on a difference between the second gain and the first gain with respect to a quality of a third channel, wherein the second channel is a channel between the another base station and the terminal.

17. The apparatus of claim 16, wherein the second gain is higher than the first gain by at least a threshold gain.

18. The apparatus of claim 16, wherein the quality of the third channel comprises a third gain, and wherein the at least one transceiver is further configured to, if the second gain exceeds a sum of the first gain and a third gain, receive the data which are transmitted by the base station cooperating with the another base station.

19. An apparatus of a upper node in a wireless communication system, the apparatus comprising:

at least one processor;

at least one transceiver, operatively coupled to the at least one processor, the at least one transceiver configured to:

receive first feedback information comprising information regarding a first gain for a first channel between a base station and a terminal, and a second gain for a combined channel of the first channel and a second channel, wherein the second channel is a channel between another base station and the terminal, and second feedback information comprising information regarding a third gain for a third channel between the another base station and another terminal, and transmit, to the base station, allocation information so that the base station transmits data to the terminal by cooperating with the another base station, wherein the cooperating of the base station with the another base station is determined based on a difference between the second gain and the first gain with respect to a quality of a third channel.

20. The apparatus of claim 19, wherein the at least one processor is configured to determine allocation information based on the first feedback information and second feedback information.

* * * * *